United States Patent [19]

Wotton et al.

[11] 4,231,588
[45] Nov. 4, 1980

[54] ADJUSTING SLEEVE ASSEMBLY

[75] Inventors: David R. Wotton, Ann Arbor; Carroll D. Dickerson, New Hudson; Lawrence A. Makowski, Livonia, all of Mich.

[73] Assignee: Ford Motor Company, Dearborn, Mich.

[21] Appl. No.: 28,625

[22] Filed: Apr. 9, 1979

[51] Int. Cl.³ .............................................. B62D 17/00
[52] U.S. Cl. .................................... 280/661; 403/161; 403/DIG. 8
[58] Field of Search ................... 280/661, 96.1, 95 R; 403/161, 162, 4, DIG. 8

[56] References Cited

U.S. PATENT DOCUMENTS

| | | | |
|---|---|---|---|
| 2,405,458 | 8/1946 | Slack et al. | 280/661 |
| 2,544,331 | 3/1951 | Kogstrom | 280/661 |
| 2,900,196 | 8/1959 | Nienke | 280/96.1 |
| 2,923,555 | 2/1960 | Kost et al. | 280/661 |
| 3,563,564 | 2/1971 | Bartowiak | 280/96.1 |
| 3,880,444 | 4/1975 | Bridges | 280/661 |
| 3,887,211 | 6/1975 | Mazur | 280/95 R |
| 4,026,578 | 5/1977 | Mattson | 280/661 |

*Primary Examiner*—Robert R. Song
*Attorney, Agent, or Firm*—Steven L. Permut; Clifford L. Sadler

[57] ABSTRACT

A sleeve assembly for adjusting the camber, and castor, or pneumatic trail, of a wheel assembly includes an inner sleeve with an aperture therethrough adapted to receive a ball stud. The inner sleeve having a partially spherical surface which is received in a complementary socket in a second sleeve which is fitted within an aperture of an upper arm of a spindle. The inner sleeve is pivotable with respect to the outer sleeve to incline the aperture therethrough with respect to the central axis of the outer sleeve such that the upper and lower openings of the aperture have opposite eccentricities with respect to the axis of the outer sleeve to angle the stud varying degrees with respect to the upper arm of the spindle.

8 Claims, 6 Drawing Figures

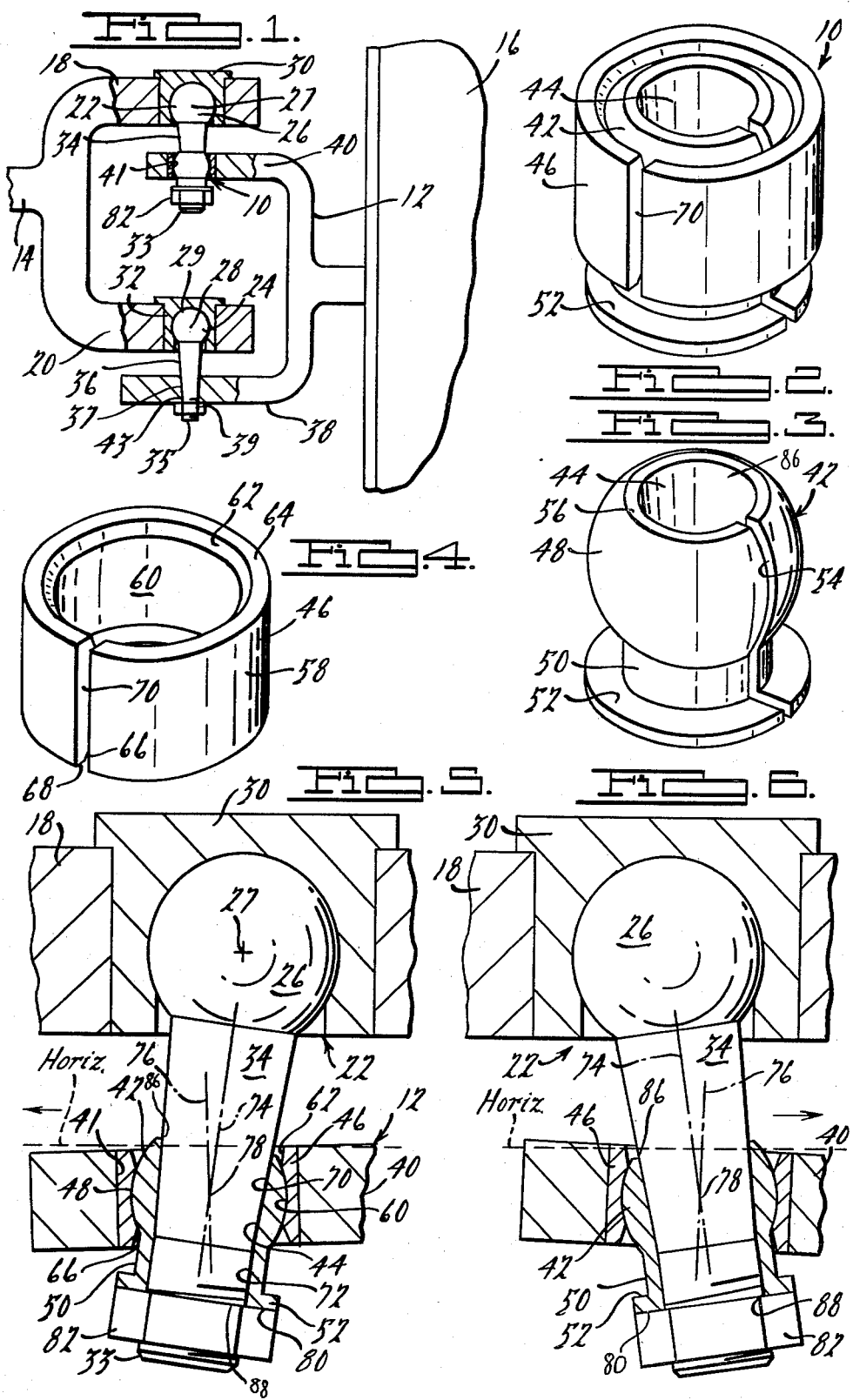

ADJUSTING SLEEVE ASSEMBLY

BACKGROUND OF THE INVENTION

1. Field of the Invention

This invention relates to adjusting sleeve assemblies and more particularly for a sleeve assembly for adjusting the camber or castor of a steerable wheel assembly in a motor vehicles.

2. Description of the Prior Art

Ball joints have long been used in automobiles to provide for rotatable motion between two connecting members. Often axial or lateral adjustments are needed between the two members to provide for the proper positioning. One of the more common ways of providing this adjustment is to provide an eccentric member which, when rotated, provides the needed adjustment. Often, the ball joint has an eccentric stud integral with the ball which when rotated, moves the eccentric stud to the desired position. U.S. Pat. No. 3,880,444 issued to Bridges on Apr. 29, 1975 and U.S. Pat. No. 3,887,211 issued to Mazur on June 3, 1975 disclose the use of eccentric studs for adjusting steering linkages. U.S. Pat. No. 2,405,458 issued to Slack et al on Aug. 6, 1946 discloses the use of an eccentrically displaced stud for adjusting the caster and camber of a steerable wheel assembly.

In addition, another common way is to provide a sleeve with an eccentrically displaced hole therethrough which when rotated provides the proper adjustment. U.S. Pat. No. 4,026,578 issued to Mattson on May 31, 1977 discloses a sleeve with an eccentrically displaced hole for adjusting a McPherson strut assembly. Such sleeves with eccentrically displaced holes with their axis parallel to the central axis of the sleeve have also been used in adjusting the camber of a steerable wheel assembly which is mounted to a spindle through upper and lower ball joints.

The extent of adjustment of these sleeves with eccentrically displaced holes is limited by the diameter of the sleeve and the size of the spindle arm which mounts the sleeve. The extent of adjustment is further limited due to the structure of the sleeve. In order for the eccentric hole which has its axis parallel to the central axis of the sleeve to receive the stud of the ball joint, the ball joint stud must angle in a direction opposite to which the camber adjustment is desired. In other words, if the top of the spindle is positioned outwardly for positive camber, the ball stud extending from a ball mounted in the control arm must point inwardly which causes the spindle to move partially to compensate for the angle of the stud. The retrograde motion of the stud unduly limits the range of camber adjustment of a given diameter sleeve.

Attempts have been made to extend the stud through the spindle at an angle which would eliminate the need for the retrograde motion of the ball stud with respect to the spindle. One such attempt is disclosed in U.S. Pat. No. 3,304,810 issued to Primeau on May 15, 1962. Primeau discloses a two-piece adaptor with partially offset and parallel apertures extending through each piece and a generally cylindrical shaped ball stud with a generally smaller diameter than the diameter of the apertures. The stud has two spherical collar sections which abut the sides of each aperture so the stud can angle through the partially offset apertures. The two-piece adaptor of Primeau requires a ball with a specifically adapted stud portion.

SUMMARY OF THE DISCLOSURE

According to the invention, a sleeve assembly is constructed for use with a steerable wheel assembly for controlling the camber and castor of the wheel assembly. The sleeve assembly is mounted to a control or suspension arm for adjusting both castor and camber of the wheel. The sleeve assembly can also be mounted to a spindle arm for adjusting camber and the pneumatic trail of the wheel. The sleeve assembly is adjustably connected to a ball stud of a ball joint. The ball joint is mounted to the complementary control arm if the sleeve assembly is mounted to a spindle arm and vice versa, to the complementary spindle arm if the sleeve assembly is mounted to a control arm.

The sleeve assembly has a first sleeve with a spherical outer portion with an aperture therethrough sized for receiving a ball stud. The rotatable spherical portion of the first sleeve is mounted within a complementary socket of a second sleeve. The second sleeve has a cylindrical outer surface which is mountable within a cylindrical aperture through one of said arms of the wheel assembly.

In one embodiment, the first sleeve has its aperture tapered corresponding to the taper of the ball stud and also has an axial slot extending therethrough. The second sleeve also has an axial slot extending therethrough to facilitate expansion of the first and second sleeves when the tapered ball stud is snugly received within the tapered aperture of the first sleeve to lock the first and second sleeves in position within the aperture of said arm.

In this fashion, the aperture within the first sleeve can be selectively angled with respect to the central axis of the second sleeve and locked into position to selectively angle the ball stud through the spindle arm and thus adjusting the camber, castor, or pneumatic trail of the wheel assembly.

BRIEF DESCRIPTION OF THE DRAWINGS

Reference now will be made to the following drawings in which:

FIG. 1 is a front elevational and partially segmented view of one embodiment of the invention in a preferred setting.

FIG. 2 is a perspective view of the embodiment of the invention shown in FIG. 1.

FIG. 3 is a perspective view of the inner sleeve shown in FIG. 2.

FIG. 4 is a perspective view of the outer sleeve shown in FIG. 2.

FIG. 5 is a cross-sectional view of the embodiment showing the spindle in a negative camber position.

FIG. 6 is a view similar to FIG. 5 showing the sleeve adjusting the spindle in a positive camber position.

DETAILED DESCRIPTION OF THE PRESENTLY PREFERRED EMBODIMENT

Referring now to FIG. 1, the sleeve assembly 10 adjustably mounts a spindle 12 to an axle 14. The spindle rotatably supports a wheel assembly 16.

The axle 14 has an upper control arm 18 and vertically spaced lower control arm 20. As shown, the control arms 18 and 20 are integral with the axle 14. Different constructions can be substituted wherein the arms 18 and 20 are pivotally mounted on a frame member (not shown). Arm 18 has a ball joint 22 mounted therein. Arm 20 has ball joint 24 mounted therein. Each ball joint 22 and 24 has respective balls 26 and 28 mounted within complementary sockets 30 and 32. Each ball 26 and 28 has an extending tapered stud portion 34 and 36 and an integral cylindrical threaded end portion 33 and 34, as more clearly shown in FIGS. 5 and 6. The lower tapered stud 36 extends through a tapered aperture 37 in the lower arm 38 of spindle 12. Fastener 39 threadably fastens to threaded end 43 and secures the ball stud 36 rigidly to the lower arm by press fitting stud 36 into hole 37. Stud 34 of the upper ball 26 extends through the sleeve assembly 10 mounted in aperture 41 of the upper arm 40 of spindle 12 to adjustably connect the spindle with respect to the axle 14 to adjust the camber and pneumatic trail of the wheel assembly 16.

Referring now to FIGS. 2, 3, and 4 the sleeve assembly 10 has an inner sleeve 42 with an aperture 44 therethrough rotatably mounted within an outer sleeve 46.

As clearly shown in FIG. 3, the inner sleeve 42 has a spherical outer portion 48, a cylindrical shaped extension 50 extending from the spherical outer portion 48, and a bottom flange 52. Aperture 44 axially extends through the ball portion 48, a cylindrical extension 50, and the bottom flange 52. A slot 54 also axially extends from the top edge 56 to the bottom flange 52 and therethrough.

The outer sleeve 46 as shown in FIG. 4 has a cylindrical outer surface 58 and a spherical shaped socket portion 60 constructed to rotatably house the spherical outer portion 48 of inner sleeve 42. In addition, an inclined shoulder 62 tapers outwardly from the socket 60 to the top edge 64 and an inclined shoulder 66 extends from socket 60 to the bottom edge 68. A slot axially extends through the outer sleeve 46 from the top edge 64 to the bottom edge 68.

Referring now to FIGS. 5 and 6, aperture 44 has a tapered section 70 and a cylindrical section 72. The shape of the aperture 46 corresponds to the shape of stud 34. The axis 74 of aperture 44 intersects a central axis 76 of outer sleeve 46 at a center radial point 78 for both the spherical surface 48 and spherical socket portion 60. Bottom flange 52 has an end surface 80 which is perpendicular to the axis 74 to provide a flush seat for nut 82 to fasten onto threaded end 32 of stud 34.

OPERATION

In operation, when the spindle 12 is desired to be adjusted from its normal position as shown in FIG. 1 to a negative camber as shown in FIG. 5, fastener 82 is loosened to allow inner sleeve 42 to pivot in any direction with respect to outer sleeve 46. Spindle arm 40 is then moved inwardly and slightly inclined due to movement of the spindle 12 about the center of rotation 29 of lower ball joint 24. Outer sleeve 46 fixedly mounted within spindle arm 40 is also inclined to the same degree as upper arm 40. Inner sleeve 42 is correspondingly rotated and angled with respect to outer sleeve 46 to realign aperture 44 with ball stud 34 such that the top end 86 of aperture 44 and bottom end 88 thereof are eccentrically positioned in opposing directions with respect to axis 76 of sleeve 46. End 86 is outwardly eccentric and end 88 is inwardly eccentric with respect to axis 76. Ball stud 34 correspondingly is inwardly angled in the direction of motion of spindle arm 40. When the proper position of spindle 12 is located, fastener 82 is refastened to wedge stud 34 within aperture 44 which expands the inner sleeve 42 and outer sleeve 46 to press fit within aperture 41 and lock therein.

As shown in FIG. 6, if a positive camber is desired, the upper arm 40 is moved outwardly and slightly inclined due to the rotation about center of rotation 29. The inner sleeve 42 is angled with respect to outer sleeve 46 such that the top end 86 and bottom end 88 are eccentrically positioned in opposing directions, of outer sleeve 46 with end 86 inwardly eccentric and end 88 outwardly eccentric with respect to the axis 76. Stud 34 is also correspondingly angled outwardly toward the direction of motion of spindle 40.

The maximum angle which aperture 44 can deviate from axis 76 is limited by the cylindrical extension 50 abutting shoulder 66 of outer sleeve 46. Shoulder 62 provides clearance for stud 34 to enter aperture 44 without interference from outer sleeve 48.

The outer cylindrical sleeve 46 can move up and down with respect to the spindle arm 40 to accommodate for manufacturing tolerances and varying distances of the first sleeve 42 from the ball 26 to provide a proper fit of tapered stud 34 within tapered aperture 44.

The sleeve assembly also can be adjusted to allow the upper spindle arm to be locked in forward or rearward position to adjust the pneumatic trail of the wheel, as well as an inner and outer position.

The sleeve assembly and ball joint can reverse positions with the sleeve assembly mounted to the upper control arm and the ball joint mounted within the spindle arm. The reversal of position allows the sleeve assembly to adjust castor as well as the camber of the wheel assembly. When the ball joint is mounted on the spindle, forward or rearward adjustment of the spindle arm changes the forward or rearward angle of the line passing through the center of rotation of the ball joints which defines the castor angle.

In this fashion, a compact adaptor sleeve assembly is constructed which can easily adjust the camber, castor or pneumatic trail of the wheel assembly.

Variations and modifications of the present invention are possible without affecting its scope and spirit which are defined in the appended claims.

The embodiments of the invention in which an exclusive property or privilege is claimed are defined as follows:

1. An adjustable mounting assembly for a steerable wheel assembly including lower and upper vertically spaced control arms connected to a supportive vehicle member, a spindle member on which a wheel is mounted, said spindle having an upper and lower arm connected to the respective upper and lower control arms, ball joints rotatably mounting each of said control arms to said spindle arms, said mounting assembly comprising;

a first sleeve being rotatably mountable in a hole in one of said upper or lower arms, one of said ball joints mounted in the other of said respective upper and lower arms;

said first sleeve having an aperture therethrough constructed to receive a stud integral with a ball forming one of said ball joints with said stud extending through said sleeve;

mounting means for selectively mounting said sleeve in said hole of said arm such that said aperture through said sleeve is selectively angled through said spindle arm;

said ball joint stud and sleeve being constructed to allow said stud to incline to extend through said angled aperture at any adjusted position of said sleeve;

locking means for fixedly locking said stud within said sleeve and said sleeve within said hole for securing said spindle in a desired position with respect to said control arms to mount said wheel assembly with a desired camber, castor, or pneumatic trail.

2. A mounting assembly as defined in claim 1 further comprising:

said sleeve having a partially spherical outer surface;

a complementary socket mounted to said one of said upper and lower arms rotatably housing said partially spherical outer surface.

3. A mounting assembly as defined in claim 2 wherein:

a second outer sleeve has an aperture therethrough with a partially spherical interior surface forming said socket;

said first sleeve having its spherical portion rotatably mounted in said socket of said second sleeve such that the axis of said aperture through said first sleeve is selectively angled with respect to the axis of said second sleeve.

4. A mounting assembly as defined in claim 3 wherein;

said ball stud is tapered from said ball joint and said aperture through said first sleeve is complementarily tapered to receive said tapered stud such that said tapered stud can abut the sides of said aperture and press fit and frictionally lock therein.

5. A mounting as defined in claim 4 further comprising:

a slot axially extending through said second sleeve and a slot axially extending through said first sleeve to facilitate radial expansion of said sleeves when said tapered stud is press fitted within said tapered aperture to frictionally lock them in position with respect to said arm in which said sleeves are mounted.

6. A mounting assembly as defined in claim 5 wherein:

said first sleeve has an integral cylindrically shaped extension extending from said spherical portion with said aperture of said first sleeve extending therethrough, an outward flange at the end of said cylindrical extension with an exterior surface in a plane perpendicular to the axis of said aperture through said first sleeve;

said cylindrical extension constructed to abut the bottom edge of said second sleeve defining the maximum angle which said aperture through said first sleeve deviates from the central axis of said second sleeve.

7. A mounting assembly as defined in claim 6 wherein:

the axis of said angled hole intersects with the radial center of said spherical interior surface such that top and bottom openings of said angled aperture are eccentrically displaced in opposing directions from the axis of said second sleeve.

8. An adjustable mounting assembly for a steerable wheel assembly including lower and upper vertically spaced control arms connected to a supportive vehicle member; ball joints rotatably mounted in each of said control arms, a spindle member on which a wheel is mounted, said spindle having an upper and lower arm connected to the respective upper and lower control arms, each of said ball joints having an integral stud mounted respectively to said upper and lower arms of said spindle; said mounting assembly comprising:

a first sleeve being rotatably mounted in a hole in one of said upper or lower arms of said spindle;

said first sleeve having an aperture therethrough constructed to receive one of said studs with said stud extending therethrough;

said first sleeve having a partially spherical outer surface;

a second outer sleeve having an aperture therethrough with a partially spherical interior surface forming a socket rotatably mounting said partially spherical outer surface of said first sleeve such that the axis of said aperture through said first sleeve is selectively angled with respect to the axis of said second sleeve;

locking means for fixedly locking said first and second sleeves with respect to said connecting ball stud and spindle at said selected angle for securing said spindle in a desired position with respect to said control arms to mount said wheel assembly with a desired camber and pneumatic trail.

* * * * *